United States Patent [19]
Kitai et al.

[11] Patent Number: 5,350,910
[45] Date of Patent: Sep. 27, 1994

[54] OPTICAL CARD PROCESSING APPARATUS WITH MEANS FOR DETERMINING A RELATIVE POSITION BETWEEN HEAD AND CARD

[75] Inventors: Hiroto Kitai; Takashi Nakahara, both of Tokyo, Japan

[73] Assignee: Canon Kabushiki Kaisha, Tokyo, Japan

[21] Appl. No.: 137,814

[22] Filed: Oct. 19, 1993

Related U.S. Application Data

[63] Continuation of Ser. No. 895,242, Jun. 8, 1992, abandoned, which is a continuation of Ser. No. 413,692, Sep. 28, 1989, abandoned.

[30] Foreign Application Priority Data

Sep. 30, 1988 [JP] Japan .................. 63-244480
Nov. 29, 1988 [JP] Japan .................. 63-299729

[51] Int. Cl.$^5$ .................. G06K 13/067; G06K 7/10
[52] U.S. Cl. .................. 235/479; 235/454; 369/44.320
[58] Field of Search .......... 235/454, 456, 470, 476, 235/479, 480; 360/2; 369/44.11, 44.32, 32

[56] References Cited

U.S. PATENT DOCUMENTS

| | | | |
|---|---|---|---|
| 3,706,860 | 12/1972 | Burbank, III | 235/480 |
| 3,836,753 | 9/1974 | Pass | 235/475 |
| 3,852,573 | 12/1974 | Dolch | 235/487 |
| 3,921,969 | 11/1975 | Hickey et al. | 235/479 |
| 4,544,835 | 10/1985 | Drexler | 235/487 |
| 4,800,258 | 1/1989 | Suzuki et al. | 235/479 |
| 4,800,546 | 1/1989 | Shikichi et al. | 235/479 |
| 4,922,351 | 5/1990 | Suzuki et al. | 358/494 |
| 4,950,876 | 8/1990 | Saito | 235/479 |
| 4,982,394 | 1/1991 | Kanda et al. | 369/44.32 |
| 5,083,301 | 1/1992 | Matoba et al. | 369/32 |

FOREIGN PATENT DOCUMENTS

| | | |
|---|---|---|
| 230275 | 7/1987 | European Pat. Off. . |
| 296590 | 12/1988 | European Pat. Off. . |
| 301537 | 2/1989 | European Pat. Off. . |
| 2575578 | 7/1986 | France . |
| 61-280073 | 12/1986 | Japan . |

OTHER PUBLICATIONS

Japanese Patent Abstract vol. 11, No. 378 for Kokai No. 62-146463, Jun. 1987.
Japanese Patent Abstract vol. 12, No. 329 for Kakai No. 63-91866, Apr. 1988.
Japanese Patent Abstract vol. 11, No. 144 No. 61-280073, Dec. 1986.

*Primary Examiner*—Davis L. Willis
*Assistant Examiner*—Edward Sikorski
*Attorney, Agent, or Firm*—Fitzpatrick, Cella, Harper & Scinto

[57] ABSTRACT

An information processing apparatus according to the present invention includes a head for performing recording of information on and/or reproduction of information from a recording medium, a carriage on which the recording medium is loaded and being adapted to be movable relative to the head, a first detector for detecting a loading position of the recording medium with respect to the carriage, a second detector for detecting a position of the carriage in a moving direction and a circuit for outputting a signal representing that the medium is loaded at predetermined position with respect to the head on the basis of outputs from the first and second detectors.

11 Claims, 8 Drawing Sheets

FIG. 5
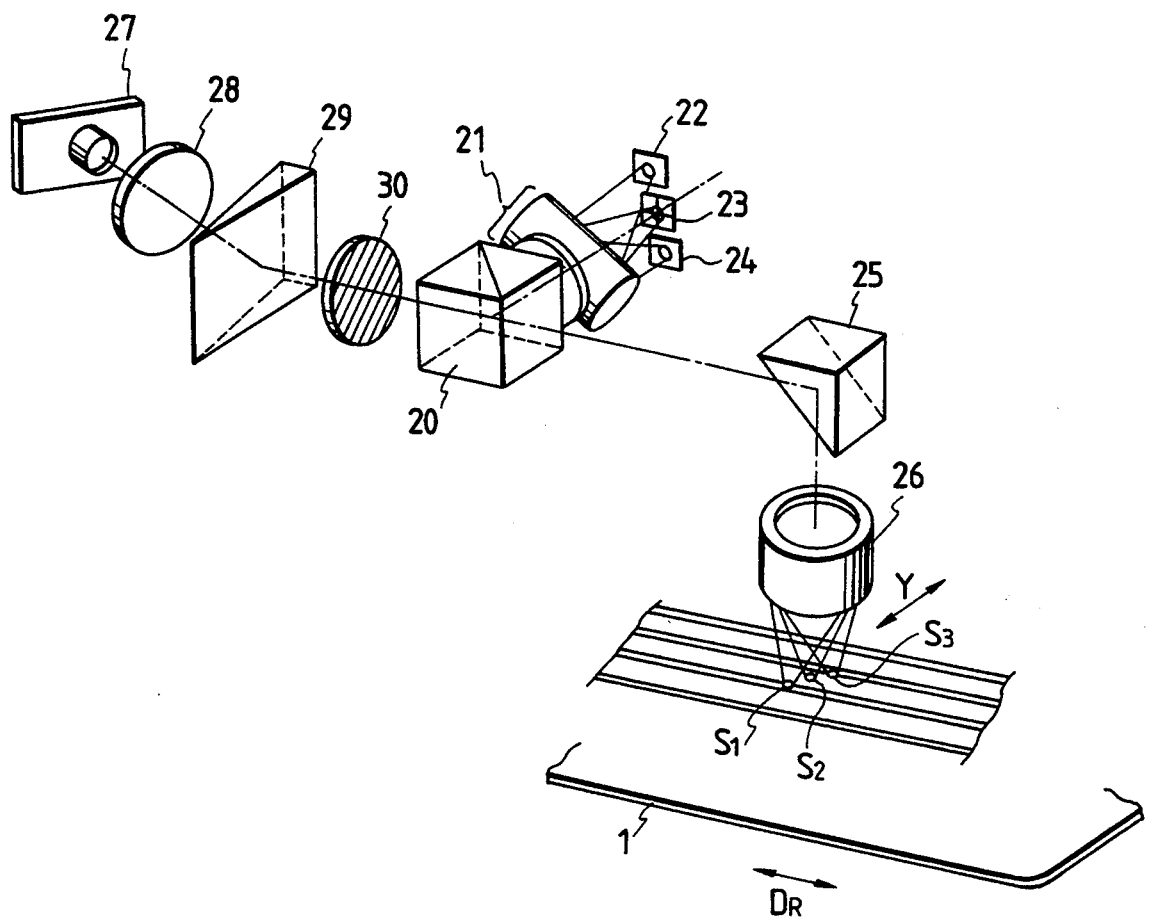
FIG. 6
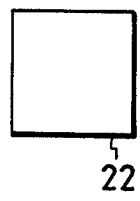
22
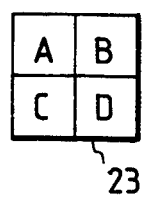
23
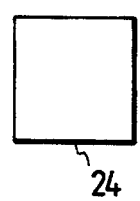
24

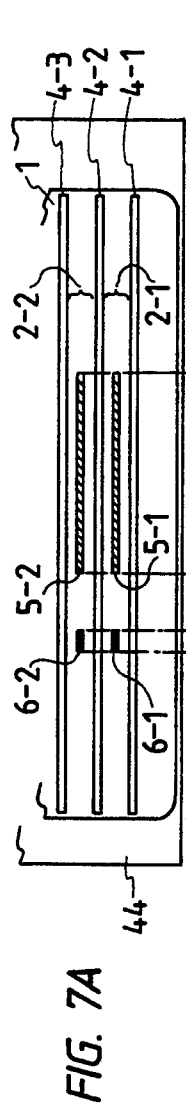
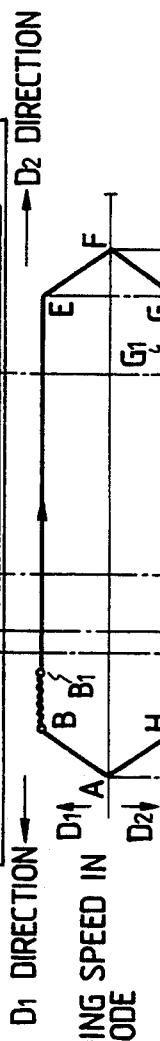
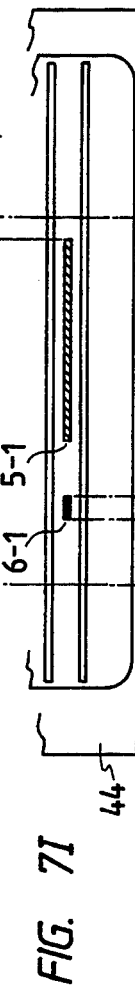
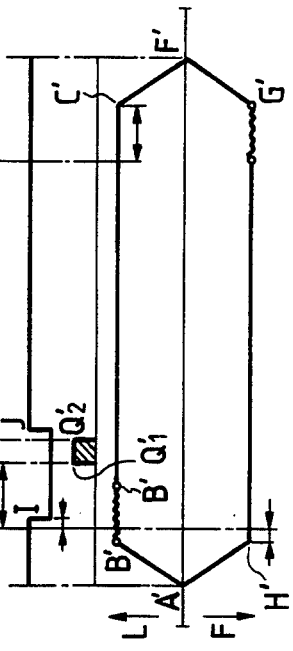

FIG. 7A

FIG. 7B  CARD FEEDING SPEED IN READING MODE

FIG. 7C  LEFT SENSOR OUTPUT a
FIG. 7D  RIGHT SENSOR OUTPUT b

FIG. 7E  ADDRESS REPRODUCTION CONTROL SIGNAL c
FIG. 7F  ADDRESS REPRODUCTION SIGNAL d
FIG. 7G  DATA REPRODUCTION CONTROL SIGNAL e
FIG. 7H  DATA REPRODUCTION SIGNAL f

FIG. 7I

FIG. 7J  ADDRESS REPRODUCTION CONTROL SIGNAL c'
FIG. 7K  ADDRESS REPRODUCTION SIGNAL d'

FIG. 7L  CARD FEEDING SPEED IN READING MODE (AFTER COMPENSATION)

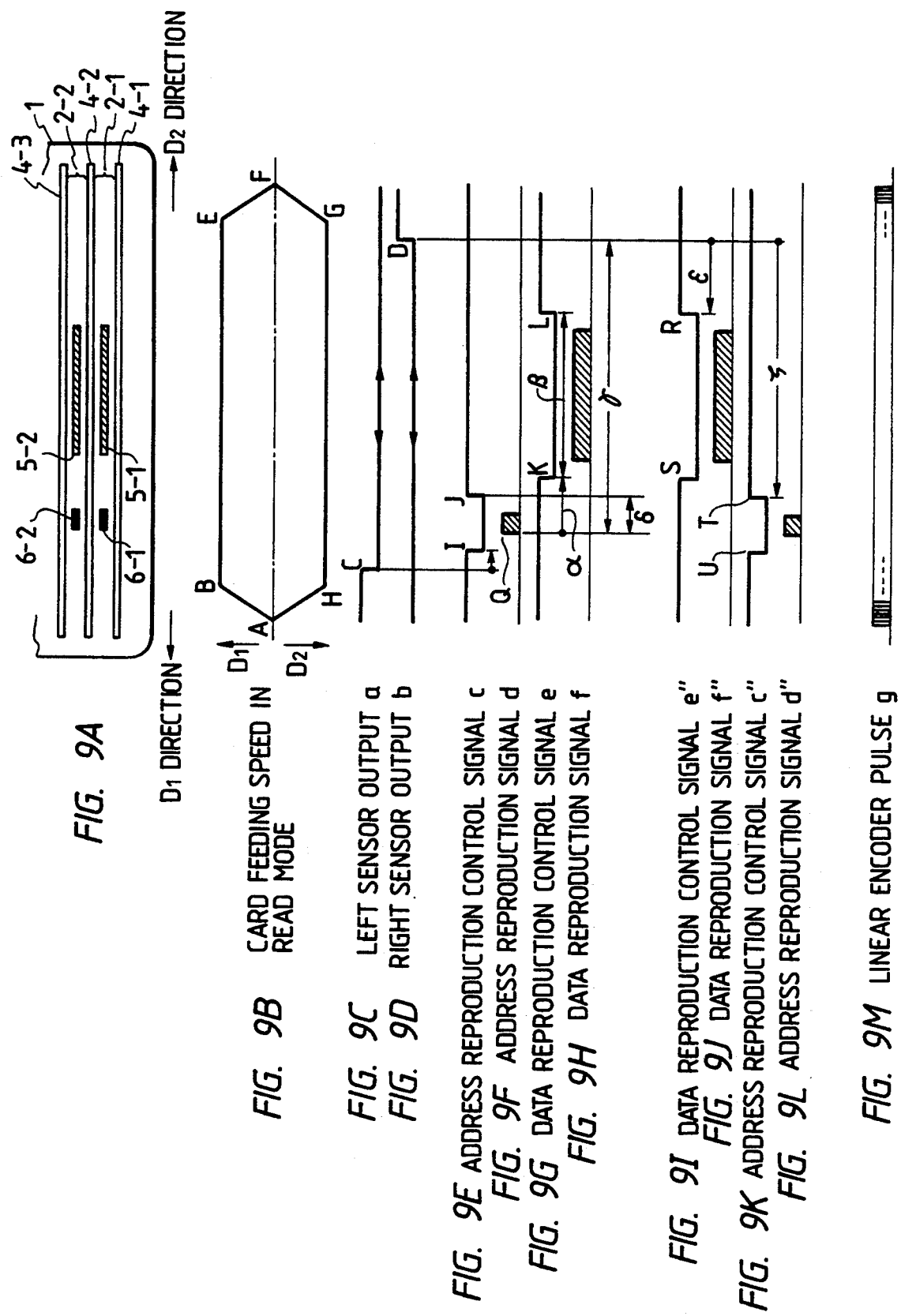

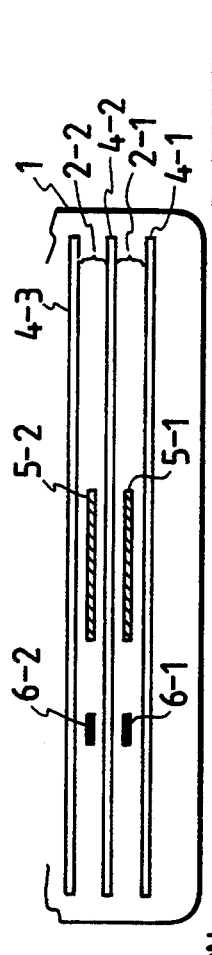
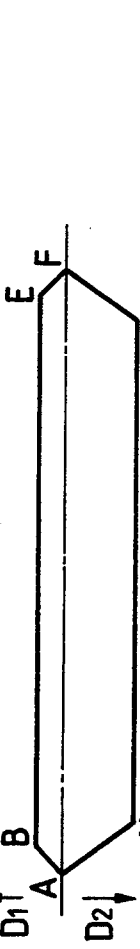

FIG. 10A

FIG. 10B  CARD FEEDING SPEED IN WRITE/VERIFY MODE

FIG. 10C  LEFT SENSOR OUTPUT a
FIG. 10D  RIGHT SENSOR OUTPUT b

FIG. 10E  ADDRESS REPRODUCTION CONTROL SIGNAL c
FIG. 10F  ADDRESS REPRODUCTION SIGNAL d
FIG. 10G  RECORDING CONTROL SIGNAL h
FIG. 10H  RECORDING SIGNAL i

FIG. 10I  DATA REPRODUCTION CONTROL SIGNAL e″
FIG. 10J  DATA REPRODUCTION SIGNAL f″
FIG. 10K  ADDRESS REPRODUCTION CONTROL SIGNAL c″
FIG. 10L  ADDRESS REPRODUCTION SIGNAL d″

FIG. 10M  LINEAR ENCODER PULSE g

OPTICAL CARD PROCESSING APPARATUS WITH MEANS FOR DETERMINING A RELATIVE POSITION BETWEEN HEAD AND CARD

This application is a continuation of prior application, Ser. No. 07/895,242 filed Jun. 8, 1992, which application is a continuation of prior application, Ser. No. 07/413,692 filed Sept. 28, 1989, both now abandoned.

BACKGROUND OF THE INVENTION

1. Field of the Invention

The present invention relates to an information processing apparatus for moving a recording medium mounted on a carriage with respect to a head to record information on the medium and/or reproduce the information from the medium.

2. Description of the Related Art

Disk, card-like, and tape-like information recording media are known as conventional information recording media. Some information recording media can record and reproduce information, and some can only reproduce information. In a recordable information recording medium, information tracks are scanned with a light beam spot having a small diameter and modulated in accordance with given recording information to record the information as an optically detectable information bit array.

In order to reproduce information of a recording medium, a given information track is scanned with a light beam having a power low enough not to record information on the recording medium, and a beam reflected by the surface of the medium or transmitted through the medium is detected. Therefore, information can be read from an information bit array of an information track.

In an optical information processing apparatus for recording or reproducing information on or from an information recording medium, a so-called "optical head" must be used to irradiate the recording medium with a light beam spot and detect a beam reflected by or transmitted through the medium. The optical head is movable in an information tracking direction and a direction perpendicular to the information tracking direction with respect to the recording medium. A relative displacement allows scanning of the information track with a light beam spot. In the optical head, part of the optical system, e.g., an objective lens is held to be movable independently in a direction along its optical axis (focusing direction) and a direction (tracking direction) perpendicular to the optical axis and in the information tracking direction of the recording medium. The objective lens is generally held through an elastic member. Movement of the objective lens in the above focusing and tracking directions is generally performed by an actuator utilizing an electromagnetic interaction.

Recording and reproduction of a card-like optical information recording medium (optical card) shown in FIG. 1 will be described below.

Referring to FIG. 1, a large number of parallel information tracks 2 extend on an information recording surface of an optical card 1 in the $D_1$–$D_2$ direction. A home position 3 is defined on the information recording surface and serves as a reference position for access of the information tracks 2. The information tracks 2 are arranged in an order of 2-1, 2-2, 2-3, . . . from the side near the home position 3. Tracking tracks (e.g., 4-1, 4-2, 4-3, . . . ) are formed adjacent to the information tracks 2 (e.g., 2-1, 2-2, 2-3, . . . ) on the information recording surface. The tracking tracks are utilized as a guide for auto-tracking (AT) a light beam spot in the recording and reproduction modes so as to accurately trace a predetermined information track with the light beam spot. In an optical information recording/reproducing apparatus, AT servo control is performed for AT. According to AT servo control, when a deviation of the light beam spot from the information track is detected (i.e., an AT error), a detection signal is negatively fed back to the tracking actuator to move the objective lens relative to the optical head so as to adjust the position of the objective lens in the tracking direction. Therefore, the light beam spot can trace the information tracks.

When the information tracks are scanned with the light beam spot in the information recording/reproduction mode, the light beam must be focused to form a spot having an optimal size (i.e., the light beam must be set in an in-focus state) on the information recording surface of the optical card. For this purpose, auto focusing (AF) servo is performed in the optical information recording/reproducing apparatus. In AF servo control, a deviation of the light beam spot from an in-focus state (i.e., an AF error) is detected, and the detection signal is negatively fed back to the focusing actuator, thereby moving the objective lens with respect to the optical head such that the objective lens is aligned with the focusing direction. Therefore, the light beam spot can be set in an in-focus state on the surface of the optical card.

Light beam spots $S_1$ and $S_3$ in FIG. 2 are used for tracking, and light beam spot $S_2$ is used for performing focusing control, forming an information pit in the recording mode, and detecting the information pit in the reproduction mode. Address portions 6-1, 6-2, 6-3, . . . are preformatted on the information tracks 2-1, 2-2, 2-3, . . . to discriminate the respective information tracks. Data portions 5-1, 5-2, 5-3, . . . follow the address portions 6-1, 6-2, 6-3, . . . . When an information track is scanned with the light beam spot $S_2$, a track number is read out from the address portion, and information is recorded in the data portion or read out therefrom to perform reproduction.

When the optical card having the above arrangement is used in an optical information processing apparatus, the following card feeding mechanism must be used. The card feeding mechanism has an arrangement shown in FIG. 3. The optical card 1 is fixed on a carriage 44 through card holders 8. Each of the card holders 8 has a groove-like shape. When the optical card 1 is slid along the upper surface of the carriage 44 from the backward direction, and abuts against a card abutment plate 7, the card holders 8 hold the optical card 1. The carriage 44 has slide bearings 46 on both its sides, and parallel slide shafts 47 extend through the corresponding slide bearings, so that the carriage 44 can be moved along the slide shafts 47 in a direction $D_1$ (or a direction $D_2$ opposite to the direction $D_1$). A coil core is arranged below the carriage 44. A coil 43 is wound around the coil core. Yokes 48 and 49 fixed on the main body of the apparatus extend above and below the coil 43 along the moving direction of the carriage 44. The yokes 48 and 49 are coupled together with a yoke 51 extending through the center of the core of the coil 43, and both ends of the yokes 48, 49, and 51 are connected to iron pieces 52, thereby constituting a magnetic circuit. For this reason, permanent magnets 53 and 54 are arranged in the yokes 48 and 49 such that their N poles oppose each other and S poles oppose each other. With this arrangement, when current flows through the coil 43, a drive force for driving the carriage 44 in the direction $D_1$ or $D_2$ is obtained in accordance with the direction of the current.

A linear encoder 31 is arranged on one side of the carriage 44. The linear encoder comprises a belt having parallel slits extending in the direction $D_1/D_2$ and a pulse detector such as a photodiode moved together with the carriage 44 to count the slits of the belt. Therefore, a displacement of the optical card upon movement of the carriage 44 can be indirectly detected.

A light-shielding plate 35 is also disposed on one side of the carriage 44 to extend parallel to the direction $D_1/D_2$. A position sensor 32 (left sensor 33 and right sensor 34 each consisting of a light-emitting element and a light-receiving element) for detecting the position of the carriage 44 upon shielding of light by the light-shielding plate 35 is fixed on the apparatus main body. These sensors are so-called photointerrupters. The mounting position of the position sensor 32 is set such that the light-shielding plate 35 shields light incident on the left sensor 33 when the carriage 44 is accelerated from the right end in the direction $D_1$ and reaches a constant speed, and that the shielding plate 35 shields light incident on the right sensor 34 when the carriage 44 is accelerated from the left end in the direction $D_2$ and reaches a constant speed. The sensors 33 and 34 of the position sensor 32 are set at high level when light is not shielded by the light-shielding plate 35. However, when light is shielded by the light-shielding plate 35, the sensors 33 and 34 are set at low level.

In the optical information processing apparatus having the card feeding mechanism described above, after the optical card 1 is loaded on the carriage 44, the carriage 44 is accelerated in the direction $D_1$ from the right end. When the carriage 44 reaches a constant speed, addressing is performed from a time when the left sensor 33 goes low to a time when the right sensor 34 goes high. Data write/read access is performed. When the right sensor 34 goes high, a predetermined number of pulses are counted by the linear encoder 31. When the count of the linear encoder 31 reaches the predetermined number, a reverse command is output to reverse the drive direction of the carriage 44 (i.e., the direction of the current supplied to the coil 43 is reversed). After the reverse operation, the carriage 44 is accelerated in a direction $D_2$. When the right sensor 34 goes low and then the left sensor 33 goes high after the carriage 44 reaches a constant speed, a predetermined number of pulses are counted by the linear encoder 31. When the count of the linear encoder 31 reaches the predetermined number, a reverse command is output to reverse the drive direction of the carriage 44.

The reverse operation, addressing, data write/read access are performed with reference to the carriage position in the optical information processing apparatus described above. Unless the optical card 1 is accurately loaded, operation errors such as an addressing timing error occur. In order to solve this problem, a card position detector 9 shown in FIG. 3 is arranged in the conventional optical information processing apparatus. A reflection photoswitch is often used as the card position detector 9. When the optical card 1 abuts against the card abutment plate 7 and is accurately loaded on the carriage 44 while the carriage 44 is located at a given position, light reflected by an end of the optical card 1 returns to the card position detector 9. For this reason, when the optical card 1 is loaded in front of the card abutment plate 7, no light reflection from the end of the optical card 1 is detected. Therefore, an inaccurate card position is discriminated.

An apparatus for detecting a loading state of a card by using an optical head in place of the above card position detector is described in Japanese Patent Laid-Open (Kokai) No. 61-280073.

In either conventional apparatus, the card loading state is detected. When the card loading position on the carriage is inaccurate, re-loading is time-consuming. If the carriage 44 is fed without re-loading the optical card 1, recording/reproduction is performed on the information tracks in a region where the moving speed of the carriage is unstable. Thus, accurate recording/reproduction cannot be performed.

SUMMARY OF THE INVENTION

It is an object of the present invention to solve the conventional problems described above and to provide an information processing apparatus capable of performing accurate recording and/or reproduction without re-loading a recording medium even if the recording medium is not accurately loaded on a carriage.

In order to achieve the above object of the present invention, there is provided an information processing apparatus comprising:

a head for performing recording and/or reproduction of information on and/or from a recording medium;

a carriage loaded with the recording medium thereon and movable with respect to the head;

a first detector for detecting a loading position of the recording medium with respect to the carriage;

a second detector for detecting a position of the carriage in a moving direction; and a circuit for outputting a signal representing that the medium is located at a predetermined position with respect to the head, on the basis of outputs from the first and second detectors.

BRIEF DESCRIPTION OF THE DRAWINGS

FIG. 5 is a perspective view showing an optical head arrangement in the apparatus shown in FIG. 4;

FIG. 6 is an enlarged view of a photodetector shown in FIG. 5;

FIGS. 7A to 7L are views showing an optical card format and signal waveforms at the respective components of the apparatus shown in FIG. 3;

FIGS. 9A to 9M are views showing an optical card format and signal waveforms of the respective components in the embodiment shown in FIG. 8; and FIGS. 10A to 10M are views showing an optical card format and signal waveforms of the respective components according to still another embodiment of the present invention.

DETAILED DESCRIPTION OF THE PREFERRED EMBODIMENTS

Figure 3:
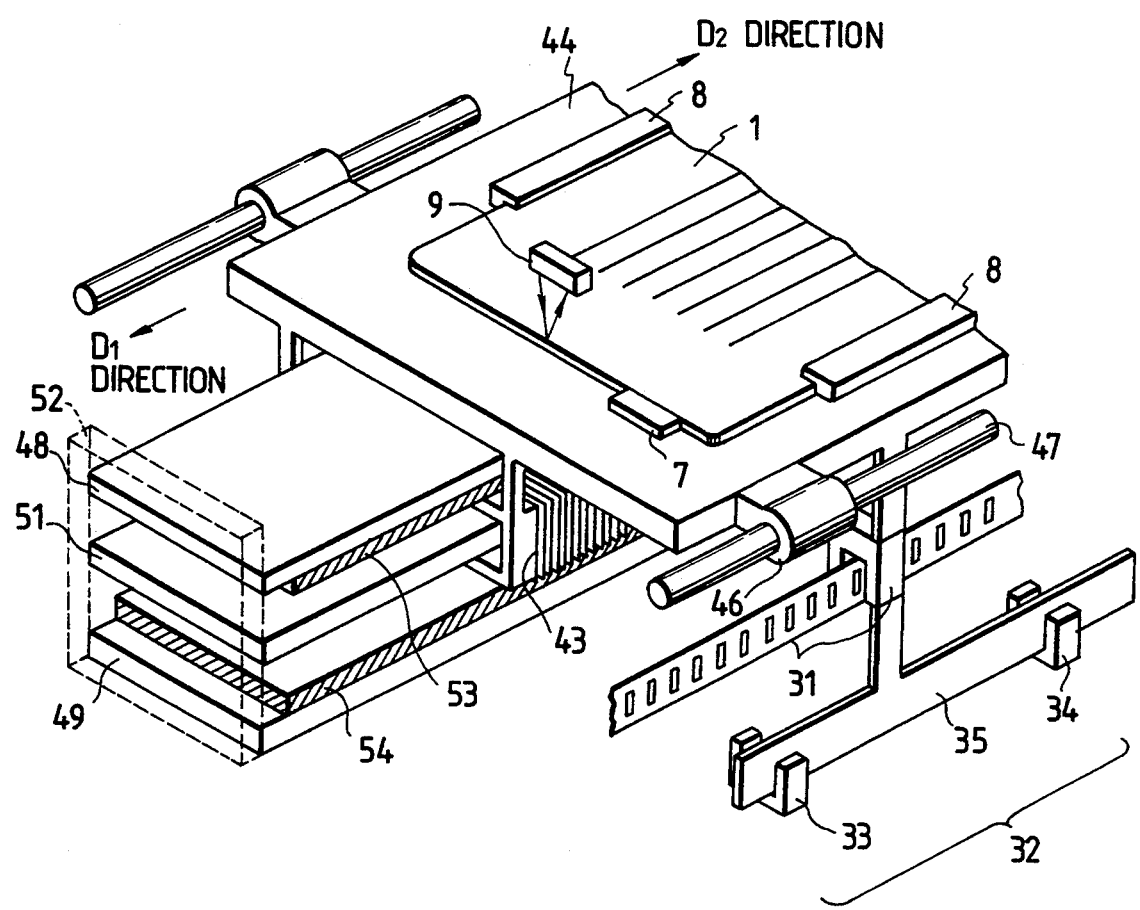
FIG. 3 is a perspective view showing a card feeding mechanism in a conventional information processing apparatus.
Figure 4:
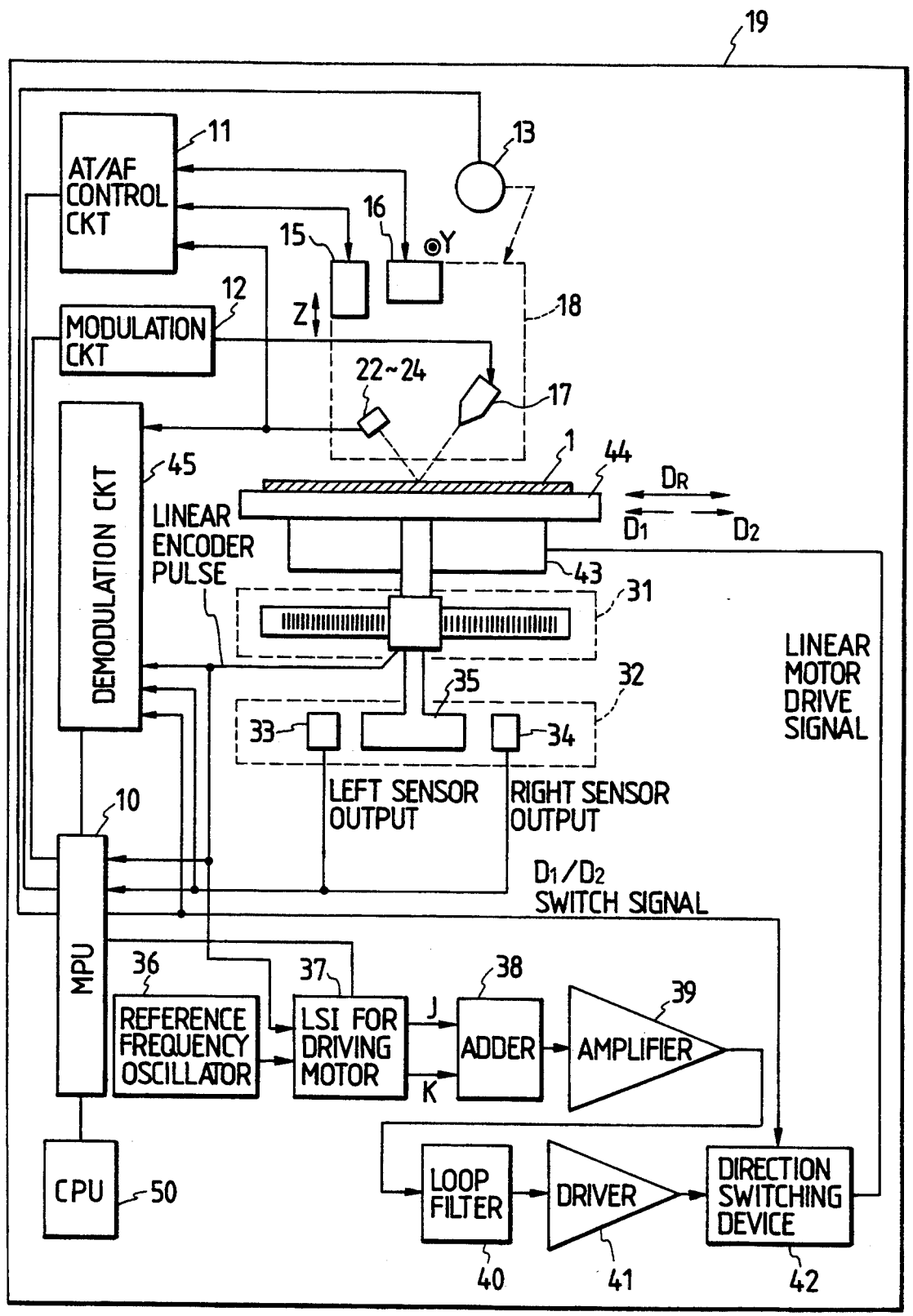
FIG. 4 is a schematic view of an information processing apparatus according to an embodiment of the present invention.

FIG. 4 is a schematic view showing an information processing apparatus according to an embodiment of the present invention. A card feeding mechanism of this embodiment is obtained by omitting the card position detector 9 from the card feeding mechanism shown in FIG. 3. A description of an arrangement and a function of the card feeding mechanism will be omitted. Referring to FIG. 4, an optical information recording/reproducing apparatus 19 is connected to a central processing unit (CPU) 50 serving as a host controller. In the recording/reproducing apparatus of this embodiment, an external optical card 1 on a carriage 44 can be loaded inside the apparatus through a convey mechanism (i.e., a linear motor including the coil 43). When recording/reproduction is completed, the optical card 1 can be ejected from the apparatus. In the recording/reproducing apparatus, a phase-locked loop (PLL) control circuit is arranged to control the carriage 44 to be driven at a constant speed. More specifically, a reference frequency signal for linear motor constant speed control is input from a reference frequency oscillator 36 to a large scale integrated circuit (LSI) 37 for driving a motor. A feedback pulse signal from a linear encoder 31 is also input to the LSI 37. A speed control output j and a phase control output k are output to an adder 38 in accordance with control signals from a microprocessing unit (MPU) 10 arranged in the recording/reproducing apparatus 19. The adder 38 adds the outputs j and k, and an output from the adder 38 is amplified by an amplifier 39. The amplified signal is filtered by a loop filter 40, and the filtered output is supplied to a driver 41. The driver 41 receives an output signal for driving the linear motor and outputs it to a coil 43 through a direction switching device 42. The direction switching device 42 switches the direction of the current in response to a $D_1/D_2$ switch signal from the MPU 10. Therefore, the $D_1/D_2$ direction of the carriage 44 can be switched.

When the operation of the carriage 44 progresses, a position detection signal from a position sensor 32 consisting of a light-shielding plate 35 mounted on the carriage and right and left sensors 34 and 33 is input to the MPU 10. This input signal is used to control the reverse operation of the carriage and also serves as a gate signal for a demodulation circuit 45 for information reproduction. The MPU 10 detects the position of the carriage on the basis of an output signal from the position sensor 32 and an output pulse from the linear encoder 31. At the same time, the MPU 10 detects a position (i.e., an information track position along the longitudinal direction) of the optical card 1, i.e., a position of an address portion, upon reception of the reproduction signal for the address portion in the information track of the optical card 1 after demodulation of the reproduction signal by demodulation circuits.

A light beam radiation optical system 17 including a light source for writing or reading information in or from the optical card is prepared to form light beam spots (three light beam spots $S_1$, $S_2$, and $S_3$ in this embodiment as previously described) on the optical card 1 in the information recording mode and/or the information reproduction mode. In order to receive reflected beams of the three light beam spots, photodetectors 22, 23, and 24 are arranged in this embodiment. Output signals from the photodetectors 22, 23, and 24 serve to supply a reproduction signal from an information track to the demodulation circuit 45 and a detection signal to an AT/AF control circuit 11. The AT/AF control circuit 11 drives an AF actuator 15 in accordance with the detection signal and control timing signals from the MPU 10 to move the objective lens of the light beam radiation optical system 17 in a direction (Z direction) perpendicular to the surface of the optical card 1 and to perform a focusing (in-focus) operation of the light beam spots. The AT/AF control circuit 11 also drives an AT actuator 16 in accordance with the detection signal and control timing signals from the MPU 10 to move, e.g., the objective lens and hence the light beam spot on the surface of the optical card 1 in a direction Y (i.e., a direction perpendicular to the directions R and Z), thereby achieving AT control. A motor 13 is driven in accordance with a control signal from the MPU 10 to move an optical head 18 in the tracking direction. The optical head 18 includes the light beam radiation optical system 17, the photodetectors 22, 23, and 24, the AF actuator 15, and the AT actuator 16. A modulation circuit 12 drives the light beam radiation optical system 17 to record the information signal from the MPU 10 or outputs a light beam for reading out the information Go obtain a reproduction signal.

FIG. 5 is a perspective view showing a detailed arrangement of the optical head 18. The optical head 18 includes a collimator lens 28, a beam shaping prism 29, a beam splitting diffraction grating 30, a beam splitter 20, a reflection prism 25, an objective lens 26, and a focus aberration converging lens system 21.

Figure 2:
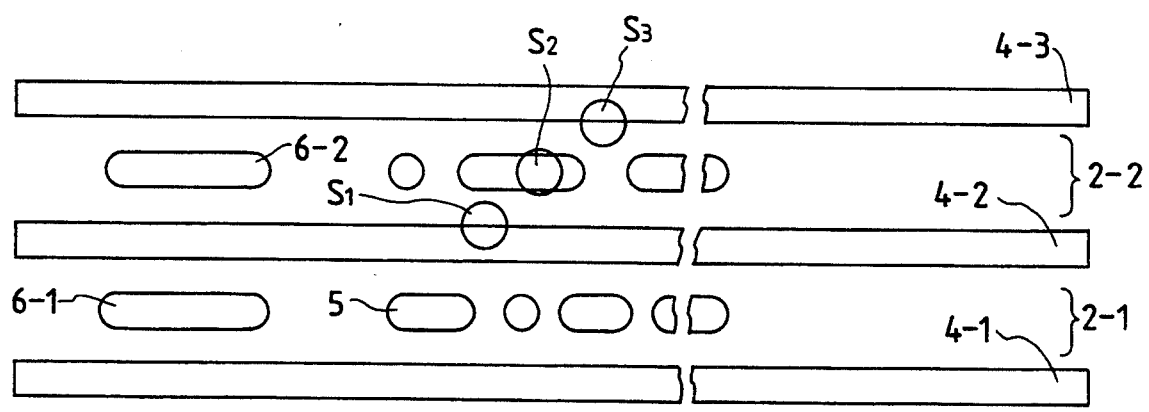
FIG. 2 is an enlarged view of an information recording surface of the optical card shown in FIG. 1.

A laser beam emitted from a semiconductor laser 27 is incident as a divergent beam on the collimator lens 28. The divergent beam is collimated by the collimator lens 28. This collimated beam is shaped by the beam shaping prism 29 to have a predetermined light intensity distribution. The shaped beam is incident on the diffraction grating 30 and is split into three effective beams (i.e., 0th-order diffracted beam and ±1st-order diffracted beams). These three beams are incident on the beam splitter 20 and are transmitted straight. The beams are then reflected by the reflection prism 25 and are incident on the objective lens 26. The beams are thus focused through the objective lens 26, thereby forming three beam spots, i.e., a beam spot $S_1$ (corresponding to the +1st-order diffracted beam), a beam spot $S_2$ (corresponding to the 0th-order diffracted beam), and a beam spot $S_3$ (corresponding to the −1st-order diffracted beam) on the optical card 1. The positional relationship between the three beams on the optical card 1 has been described with reference to FIG. 2. Reflected beams of the three beam spots formed on the optical card 1 are almost collimated through the objective lens 26. The collimated beams are reflected by the reflection prism 25 and are further reflected by the beam splitter 20. The reflected beams are converged by the converging lens system 21. The converged beams are respectively incident on the photodetectors 22, 23, and 24. FIG. 6 schematically illustrates the respective photodetectors, and the photodetector 23 is a four-split beam splitter.

A method of detecting a loading state of the optical card on the carriage 44 in this embodiment will be described with reference to FIGS. 7A to 7L. FIGS. 7A to 7H show relationships among the card feeding speed, beam spot positions on the card, detection signals from the respective sensors, and control signals in the reading mode. In this case, a state representing an appropriate loading state of the optical card 1 on the carriage 44 is exemplified. More specifically, the optical card 1 is accelerated in a direction $D_1$ from a point A and reaches a constant speed as a reproduction speed at a point $B_1$. A left sensor output a goes low at a point C. A predetermined number of encoder pulses are counted from the point C. An address reproduction control signal c falls at a point I and is kept low during a predetermined interval ($\overline{IJ}$). Meanwhile, the address portion 6-1 is reproduced to output an address reproduction signal d. The address reproduction signal d is a binary signal obtained by performing appropriate processing suitable for frequency and amplitude characteristics of the reproduction signal of the address portion. In this case, the address reproduction signal is used as a window for card position detection. Edges $Q_1$ and $Q_2$ of the address reproduction signal are detected. If the edges $Q_1$ and $Q_2$ fall within the interval $\overline{IJ}$, the card is loaded on the carriage 44 within an allowable range, i.e., within an allowable range for correcting the reverse position of the carriage 44. If one or both of the edges $Q_1$ and $Q_2$ does not fall within the interval $\overline{IJ}$, improper loading of the optical card on the carriage 44 is determined and re-loading of the optical card is determined to be required.

Thereafter, a predetermined number of linear encoder pulses are counted from, e.g., the leading edge $Q_1$ of the address reproduction signal. A data reproduction control signal e falls at a point K and is kept low within a predetermined interval. The data reproduction control signal e is a timing signal representing reproduction of a data portion. For example, the signal e is used when reproduction characteristics of the address and data portions are different from each other and reproduction processing is switched to match with reproduction of the data portion or when timings with other signals are matched.

FIGS. 7I to 7L show a case wherein an error of loading of the optical card on the carriage 44 falls within the allowable range. In this case, an address reproduction control signal c' is output at the same timing as in FIG. 7E. However, like the address reproduction signal d', the address reproduction control signal is shifted by an amount corresponding to a difference between a distance between the point c and the edge $Q_1'$ and a distance between the point c and the edge $Q_1$ or $\overline{CQ_1'}-\overline{CQ_1}$ as compared with the reference interval of an amount corresponding to a distance between the point c and the edge $Q_1$ or $\overline{CQ_1}$ of FIG. 7D in the direction $D_2$. The optical card is accelerated in the direction $D_1$ from the point A and reaches an almost constant speed at the point B. However, the speed is unstable in an interval $BB_1$. It is thus preferable to start the reproduction operation of the recording area from a point $B_1$. Similarly, the speed is stabilized from a point $G_1$ during scanning in the direction $D_2$. At the position of the optical card shown in FIG. 7I, it is difficult to perform accurate reproduction since the speed unstable region between the intervals $GG_1$ reaches the right end of the data area during scanning of the carriage 44 in the direction $D_2$. According to the present invention, the scanning reverse position of the carriage 44 is shifted by the amount $\overline{CQ_1'}-\overline{CQ_1}$ which is a shift from the reference position. In other words, during carriage feeding in the direction $D_1$ in FIG. 7D, deceleration is started with a delay of an amount $\overline{DE}$ from a point D. However, as shown in FIG. 7L, compensation is conducted so that deceleration is started with a delay of $DC'=\overline{DE}+(\overline{CQ_1'}-\overline{CQ_1})$. Although deceleration is basically started with a delay of an amount $\overline{CH}$ from a point C in carriage feeding in the direction $D_2$, compensation is performed to start deceleration with a delay of $CH'=\overline{CH}-(\overline{CQ_1'}-\overline{CQ_1})$. In this manner, the loading position errors of the optical card 1 can be compensated to always scan the same area of the optical card 1 with the light beam spot and to achieve recording and reproduction.

This compensation may be performed for every carriage feeding. However, the compensation may be performed for every appropriate interval. Alternatively, the compensation may be performed once upon insertion of the card, and the compensation value may be replaced with a representative value in the subsequent operations.

Figure 1:
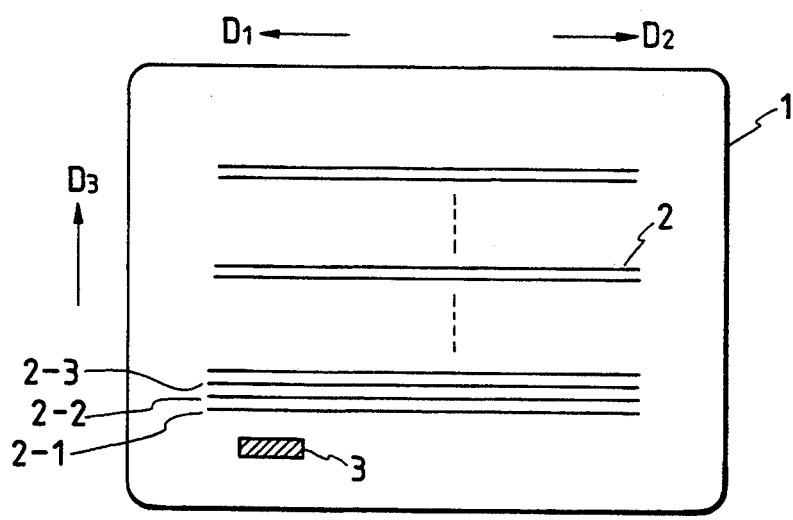
FIG. 1 is a plan view of a conventional optical card.

In the above embodiment, the address portion which is preformatted in each track is used to detect a card position. However, a preformatted recording portion (e.g., a home position 3 in FIG. 1) may be used for detecting a card position.

In the above embodiment, while the leading and trailing edges $Q_1$ and $Q_2$ of the address reproduction signal fall within the low-level interval of the address reproduction control signal c, loading of the card falls within the allowable range of the reverse position of the carriage possible to be compensated. However, even if one of the edges $Q_1$ and $Q_2$ falls within the low-level interval of the address reproduction control signal c, loading may fall within the reverse enable range of the carriage. In the above embodiment, a low level of the address reproduction control signal is used as a window for card detection. However, a window signal obtained in a similar technique may be used to detect the card position. The window signal is generated by using an output from the position detector and the pulses from the linear encoder. However, a window signal may be directly generated by using another position sensor.

In the above embodiment, the detected loading position information of the optical card is also used to compensate for the carriage reverse timing. However, when a medium in which address and data signals are recorded by different schemes is used, the detected information described above may be used for a switching scheme of a reproduction signal processing circuit. This will be described below.

Figure 8:
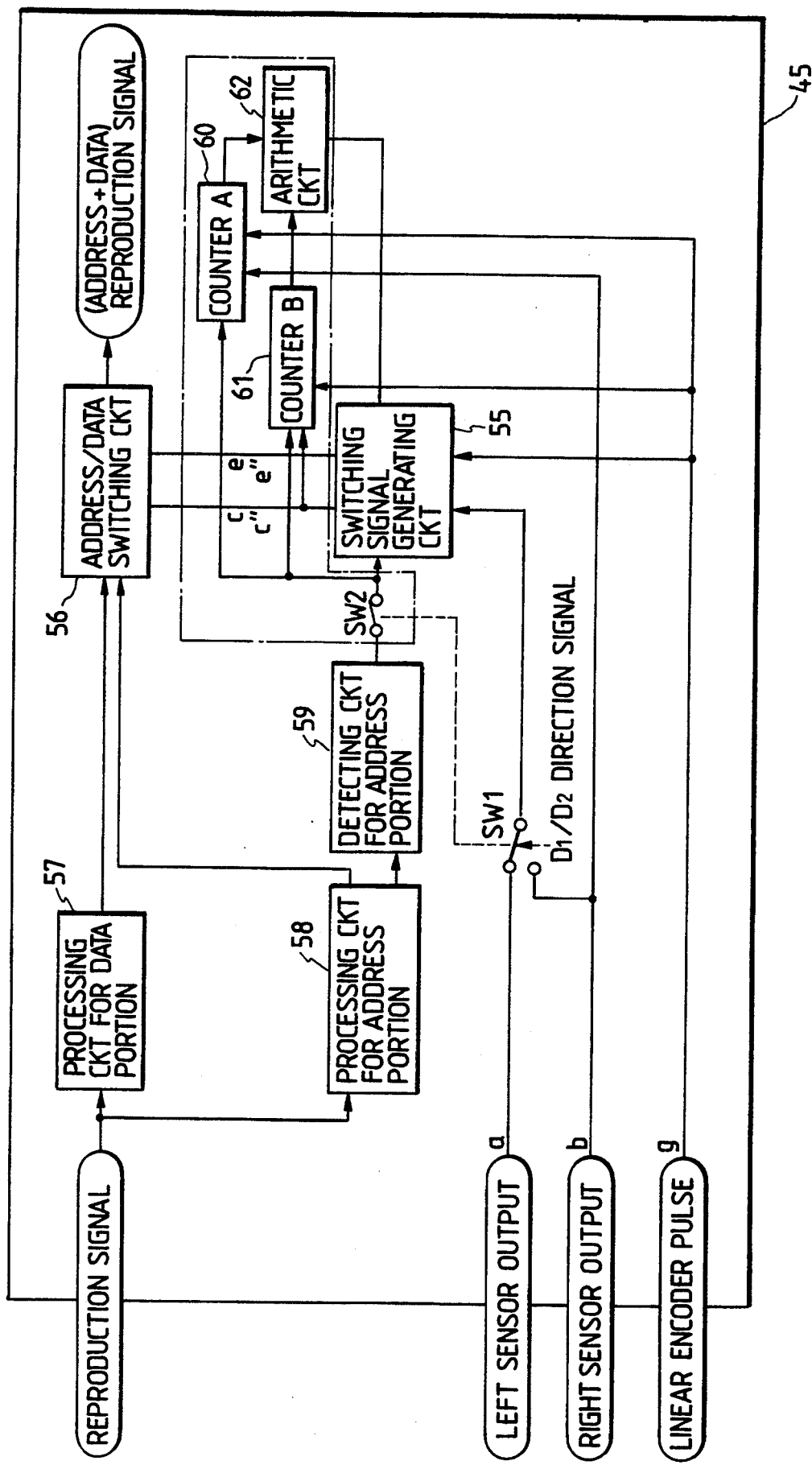
FIG. 8 is a block diagram showing a demodulation circuit used in another embodiment of the present invention.

FIG. 8 is a block diagram showing a demodulation circuit 45 used in the second embodiment of the present invention. The demodulation circuit is incorporated in the apparatus, as shown in FIG. 4.

FIG. 9A is an enlarged view showing a recording surface of an optical card used in this embodiment, FIG. 9B shows a scanning speed during feeding of the optical card in the reading mode and a moving state of the optical card, and FIGS. 9C to 9M show relationships between radiated positions of the light beam spots on the optical card and the respective control signals. FIGS. 10A to 10M are views showing relationships among the scanning speed of the card 1, the radiated positions of a light spot on the card, and the respective control signals in a write/verify mode. FIGS. 10A to 10M correspond to FIGS. 9A to 9M, respectively.

Switching of the address/data reproduction in the reading mode will be described with reference to FIGS. 8 and 9A to 9M will be described below.

When an optical card 1 is moved in a direction $D_1$, a switch SW1 is switched to a left sensor 33 side in response to a $D_1/D_2$ direction signal. An output a from the left sensor 33 is input to a switching signal generating circuit 55. The optical card 1 is gradually moved in the direction $D_1$ from a point A (FIG. 9B) and is accelerated to reach a constant reproduction speed from a point B. When the output a from the left sensor goes low at a point C (FIG. 9C), linear encoder pulses g are counted. When a predetermined number of linear encoder pulses are counted, an address reproduction control signal c falls from a point I (FIG. 9E) and is kept low during a predetermined interval (the I-J interval). The address reproduction control signal c is input to an address/data switching circuit 56.

A reproduction signal read from an information track 2-1 is input to a processing circuit 57 for a data portion and a processing circuit 58 for an address portion. The processing circuit 58 processes the address reproduction signal d of the address portion 6-1 (FIG. 9A) of the reproduction signal in accordance with its frequency and amplitude characteristics to output a binary signal. The binary signal is input to the address/data switching circuit 56 and a detecting circuit 59 for the address portion.

The address/data switching circuit 56 outputs the address reproduction signal d input from the processing circuit 58 during the low-level interval (i.e., the I-J interval) of the address reproduction control signal c. The detecting circuit 59 supplies a detection signal of the edge Q (leading or trailing edge) of the address reproduction signal d to the switching signal generating circuit 55 through a switch SW2.

The switching signal generating circuit 55 counts a predetermined number ($\alpha$) of linear encoder pulses g from the edge Q of the address reproduction signal d. The data reproduction control signal e falls at a point K and is kept low during a predetermined interval (i.e., K-L interval which is an interval "$\beta$"). The data reproduction control signal e is input to the address/data switching circuit 56.

During the low-level interval of the data reproduction control signal e, a data reproduction signal f of the data portion 5-1 input from the processing circuit 57 is output from the address/data switching circuit 56.

Meanwhile, when the address portion detection signal which is transmitted through the detecting circuit 59 is input to a counter A60 and a counter B61, counting of linear encoder pulses g is started. The counter A60 continuously counts the pulses ($\gamma$) until a right sensor output b goes high. The counter B61 continuously counts pulses ($\delta$) until a point J where the address reproduction control signal c goes high.

The optical card 1 is decelerated at a point E and its drive direction is reversed in the direction F. The optical card 1 is then accelerated and reaches a predetermined reproduction speed from a point G. In this case, a track jump occurs at the normal reverse position point F, and the information track 2-2 is irradiated with the beam spot S2. At this point F, the switch SW1 is switched so that the right sensor output b is passed. A count $\gamma$ counted by the counter A60 is used to perform a calculation $\epsilon = \gamma - \alpha - \beta$ by an arithmetic logic unit 62. Values $\alpha$ and $\beta$ are eigenvalues, and the respective value $\gamma$ is changed when the optical card 1 is inclined relative to the carriage 44. When the right sensor output b goes low at the point D, the calculated number $\epsilon$ (FIG. 9I) of linear encoder pulses are counted. A data reproduction control signal e'' falls at a point R (FIG. 9I) and is kept low during a predetermined interval (an R-S interval, $\beta$ pulses). The data reproduction control signal e'' is input to the address/data switching circuit 56.

Meanwhile, the reproduction signal reproduced from the information track 2-2 is input to the processing circuits 57 and 58 and is converted into a binary signal, so that a data reproduction signal f'' of the data portion 5-2 is output first. During the low-level interval of the data reproduction control signal e'', the data reproduction signal f'' of the data portion 5-2 input from the processing circuit 57 is output from the address/data switching circuit 56.

The arithmetic logic circuit 62 performs a calculation $\zeta = \gamma - \delta$. After linear encoder pulses g corresponding to the "$\zeta$" are counted from the point D, the address reproduction control signal c'' falls at a point T and is kept low during a predetermined interval (i.e., a T-U interval). This signal is input to the address/data switching circuit 56. When an address portion reproduction signal d'' output from the processing circuit 58 is input to the address/data switching circuit 56, the address portion reproduction signal d'' is output from the address/data switching circuit 56 during the low-level interval of the address reproduction control signal c''.

FIGS. 10A to 10M show relationships between the scanning speed of the optical card, the portions of the optical card 1 irradiated with the light beam spots, and the respective control signals in a write/verify mode.

In the recording mode, the power of the light beam from a light beam radiation optical system 17 must be increased. For this purpose, the scanning speed of the light beam is lower than that in the reproduction mode.

Information write access is performed in the forward path during optical card movement. The track in which the information is written in the forward path is scanned at a high speed to reproduce the information in the backward path so as to confirm the recorded state.

This mode is called a write/verify mode.

A difference between a data address switching operation in the write/verify mode and that in the reading mode is that a recording control signal h falls at a point K' and is kept low during a predetermined interval (a K'-L' interval, $\beta'$ count) when the linear encoder pulses are counted from the edge Q of the address portion reproduction signal d during a predetermined interval (corresponding to $\alpha'$ count). The recording control signal h is used as a control signal for sending out a modulated recording signal i for writing recording data.

In the above embodiment, the linear encoder pulses are counted. However, if the moving distance of the carriage can be detected, a rotary encoder may be used. Alternatively, another drive technique may be utilized although the carriage is driven using a linear motor.

The present invention is not limited to the particular embodiments described above, and various changes and modifications may be made within the spirit and scope of the invention. Each of the above embodiments exemplifies an optical information processing apparatus. However, the present invention is also applicable to a magnetic information processing apparatus using a magnetic head. In addition, the shape of the medium is not limited to a card-like shape. The present invention is also applicable to an apparatus using a disk-like or tape-like medium. Other various applications may be incorporated in the present invention without departing from the scope of the appended claims.

What is claimed is:

1. An information processing apparatus comprising:
   a head for effecting at least one of recording of information on and reproducing of information from a recording medium;

a carriage loaded with the recording medium thereon and movable in a moving direction with respect to said head;

a first detector for determining an amount of shift between a position of the recording medium loaded on said carriage and a reference position on said carriage in the moving direction of said carriage, and for outputting a shift amount determination signal corresponding to the shift amount;

a second detector for detecting that said carriage is positioned at a first predetermined position, in the moving direction, and for outputting a position detection signal; and an output circuit for receiving the shift amount determination signal and the position detection signal, and for outputting a signal indicating that the recording medium is positioned at a second predetermined position, with respect to said head, based on the shift amount determination signal and the position detection signal.

2. An apparatus according to claim 1, wherein address information and data are recorded on the recording medium along the moving direction according to different recording schemes, and said apparatus further comprises a first reproducing circuit for reproducing the address information and a second reproducing circuit for reproducing the data, and wherein said first and second reproducing circuits are selectively operated according to the signal output from said output circuit.

3. An apparatus according to claim 1, further comprising means for reciprocally driving said carriage.

4. An apparatus according to claim 3, further comprising means for reversing the moving direction of said carriage in response to the signal output from said output circuit.

5. An apparatus according to claim 3, wherein said second detector generates signals when said carriage is moved in one direction and in the opposite direction.

6. An apparatus according to claim 1, wherein said head reads a mark formed on the recording medium, and said first detector determines the shift amount on the basis of the position of said carriage when said head reads out the mark and the position of said carriage when said second detector outputs the position detection signal 7. An apparatus according to claim 6, wherein the mark comprises address information recorded on the medium.

8. An apparatus according to claim 6, wherein said first detector comprises an encoder for intermittently outputting pulse signals in accordance with the movement of said carriage and a counter for counting the pulse signals output from said encoder, and wherein a position of said carriage is measured based the output pulse signals.

9. An apparatus according to claim 1, wherein said second detector comprises a photointerrupter.

10. An apparatus according to claim 1, wherein said head comprises a light source for radiating a light beam on the medium, and a photodetector for receiving a beam reflected by the medium.

11. An apparatus according to claim 1, further comprising means for moving said head in a direction perpendicular to the moving direction of said carriage.

* * * * *

UNITED STATES PATENT AND TRADEMARK OFFICE
CERTIFICATE OF CORRECTION

PATENT NO. : 5,350,910
DATED : September 27, 1994
INVENTOR(S) : Hiroto KITAI, et al.

It is certified that error appears in the above-indentified patent and that said Letters Patent is hereby corrected as shown below:

ON THE COVER PAGE:

UNDER "OTHER PUBLICATIONS":

"Japanese Patent Abstract vol. 12, No. 329 for Kakai No." should read --Japanese Patent Abstract vol. 12, No. 329 for Kokai No.--.

IN THE ABSTRACT:

Line 11, "at predetermined" should read --at a predetermined--.

COLUMN 7:

Line 43, "point c" should read --point C--;
Line 44, "point c" should read --point C--;
Line 46, "point c" should read --point C--;
Line 47, "7D" should read --7F--; and
Line 64, "point D." should read --point D.--.

COLUMN 10:

Line 16, "Signal" should read --signal--.

UNITED STATES PATENT AND TRADEMARK OFFICE
CERTIFICATE OF CORRECTION

PATENT NO. : 5,350,910
DATED : September 27, 1994
INVENTOR(S) : Hiroto KITAI, et al.

It is certified that error appears in the above-indentified patent and that said Letters Patent is hereby corrected as shown below:

<u>COLUMN 12</u>:

Line 12, "signal" should read --signal.--; and
    Line 22, "based" should read --based on--.

Signed and Sealed this

Second Day of May, 1995

Attest:

BRUCE LEHMAN

*Attesting Officer*    *Commissioner of Patents and Trademarks*